United States Patent
Blagodurov et al.

(10) Patent No.: US 11,341,059 B2
(45) Date of Patent: *May 24, 2022

(54) USING MULTIPLE MEMORY ELEMENTS IN AN INPUT-OUTPUT MEMORY MANAGEMENT UNIT FOR PERFORMING VIRTUAL ADDRESS TO PHYSICAL ADDRESS TRANSLATIONS

(71) Applicant: Advanced Micro Devices, Inc., Santa Clara, CA (US)

(72) Inventors: Sergey Blagodurov, Bellevue, WA (US); Andrew G. Kegel, Redmond, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/894,473

(22) Filed: Jun. 5, 2020

(65) Prior Publication Data
US 2020/0301849 A1 Sep. 24, 2020

Related U.S. Application Data

(63) Continuation of application No. 15/167,038, filed on May 27, 2016, now Pat. No. 10,678,702.

(51) Int. Cl.
*G06F 12/10* (2016.01)
*G06F 12/1009* (2016.01)
(Continued)

(52) U.S. Cl.
CPC ........ *G06F 12/1009* (2013.01); *G06F 3/0608* (2013.01); *G06F 3/0632* (2013.01);
(Continued)

(58) Field of Classification Search
CPC ............. G06F 12/1009; G06F 12/1081; G06F 12/1027; G06F 12/0292; G06F 3/0608;
(Continued)

(56) References Cited

U.S. PATENT DOCUMENTS 6,370,632 B1    4/2002  Kikuta et al.
7,222,214 B2    5/2007  Belevich et al.
(Continued)

OTHER PUBLICATIONS

Amit, Nadav et al., "IOMMU: Strategies for mitigating the IOTLB bottleneck," WIOSCA 2010—Sixth Annual Workshop on the Interaction between Operating Systems and Computer Architecture, 2010.

*Primary Examiner* — Hiep T Nguyen
(74) *Attorney, Agent, or Firm* — Park, Vaughan, Fleming & Dowler LLP (57) ABSTRACT

The described embodiments include an input-output memory management unit (IOMMU) with two or more memory elements and a controller. The controller is configured to select, based on one or more factors, one or more selected memory elements from among the two or more memory elements for performing virtual address to physical address translations in the IOMMU. The controller then performs the virtual address to physical address translations using the one or more selected memory elements.

26 Claims, 2 Drawing Sheets

(51) Int. Cl.
*G06F 12/1081* (2016.01)
*G06F 12/1027* (2016.01)
*G06F 3/06* (2006.01)

(52) U.S. Cl.
CPC ........ *G06F 3/0685* (2013.01); *G06F 12/1027* (2013.01); *G06F 12/1081* (2013.01); *G06F 2212/1028* (2013.01); *G06F 2212/657* (2013.01); *G06F 2212/681* (2013.01); *Y02D 10/00* (2018.01)

(58) Field of Classification Search
CPC ................ G06F 3/0632; G06F 3/0685; G06F 2212/681; G06F 2212/1028; G06F 2212/657; Y02D 10/00
See application file for complete search history.

(56) References Cited

U.S. PATENT DOCUMENTS

| | | | | |
|---|---|---|---|---|
| 7,739,474 | B2 ‡ | 6/2010 | Engbersen | G06F 12/1483 711/203 |
| 8,086,765 | B2 ‡ | 12/2011 | Turner | G06F 12/1081 710/1 |
| 8,244,978 | B2 ‡ | 8/2012 | Kegel | G06F 12/1027 711/118 |
| 9,626,300 | B2 ‡ | 4/2017 | Serebrin | G06F 3/0611 |
| 2007/0038839 | A1 ‡ | 2/2007 | Hummel | G06F 12/1027 711/207 |
| 2007/0130441 | A1 ‡ | 6/2007 | Wooten | G06F 12/1027 711/203 |
| 2007/0214339 | A1 ‡ | 9/2007 | Wooten | G06F 12/1027 711/202 |
| 2009/0048819 | A1 | 2/2009 | Norman | |
| 2009/0313695 | A1 | 12/2009 | Bridges et al. | |
| 2010/0011147 | A1 ‡ | 1/2010 | Hummel | G06F 9/45558 711/6 |
| 2010/0161923 | A1 | 6/2010 | Gadelrab | |
| 2010/0250836 | A1 * | 9/2010 | Sokolov | G06F 13/28 711/103 |
| 2011/0271014 | A1 ‡ | 11/2011 | Turner | G06F 12/1081 710/22 |
| 2012/0011300 | A1 * | 1/2012 | Hung | G06F 12/0246 711/103 |
| 2012/0272037 | A1 ‡ | 10/2012 | Bayer | G06F 12/0292 711/202 |
| 2013/0138840 | A1 | 5/2013 | Kegel et al. | |
| 2013/0212313 | A1 | 8/2013 | Cota-Robles et al. | |
| 2013/0262736 | A1 | 10/2013 | Kegel et al. | |
| 2015/0278011 | A1 | 10/2015 | Keppel et al. | |
| 2016/0077761 | A1 | 3/2016 | Stabrawa et al. | |

\* cited by examiner
‡ imported from a related application

USING MULTIPLE MEMORY ELEMENTS IN AN INPUT-OUTPUT MEMORY MANAGEMENT UNIT FOR PERFORMING VIRTUAL ADDRESS TO PHYSICAL ADDRESS TRANSLATIONS

RELATED APPLICATIONS

The instant application is a continuation of, and hereby claims priority to, pending U.S. application Ser. No. 15/167,038, which was filed on 27 May 2016, and which is incorporated by reference herein in its entirety.

BACKGROUND

Field

The described embodiments relate to computing devices. More specifically, the described embodiments relate to using multiple memory elements in an input-output memory management unit (IOMMU) in a computing device for performing virtual address to physical address translations.

RELATED ART

Many computing devices include peripherals such as graphics processing units (GPUs), digital signal processors (DSPs), etc. In some computing devices, some or all of the peripherals are provided with access to a memory in the computing device (e.g., a main memory in the computing device). In some of these computing devices, the peripherals use a "virtual memory" technique for accessing memory. For the virtual memory technique, peripherals (or workloads executed by the peripherals) address memory using "virtual addresses" in "virtual address spaces," which are address spaces that are specific to corresponding peripherals, instead of addressing memory using the "physical addresses" of the physical locations where data is located in the shared memory. The virtual addresses used by peripherals may not map directly to the physical addresses—and therefore may not indicate the locations in the shared memory where corresponding data is actually stored. The computing devices therefore include mechanisms such as input-output memory management units (IOMMUs) that are configured to provide virtual address to physical address translations for the peripherals. An IOMMU, upon receiving a request from a peripheral that includes virtual addresses, translates the virtual address into a corresponding physical address. The IOMMU then provides the physical address to the requesting peripheral, which can then perform memory access(es) using the physical address.

In order to enable the above-described virtual address to physical address translation, the computing devices include "page tables." A page table is a record stored in a memory of a computing device that includes an entry, or a "page table entry," with virtual address to physical address translation information for pages (e.g., 4 KB blocks of data) that are stored in the memory. Upon receiving a request from a peripheral to translate a given virtual address, an IOMMU acquires corresponding physical address information from the page table by performing a "page table walk," during which the page table is searched, possibly entry-by-entry, for a page table entry that provides the physical address associated with the virtual address.

Because page table walks are relatively slow, it is desirable to avoid performing page table walks. IOMMUs therefore include translation lookaside buffers ("TLBs"), which are local caches that are used for storing a limited number of copies of page table entries acquired during page table walks. An IOMMU will first attempt to acquire cached page table entry information from a corresponding TLB for performing a virtual address to physical address translation. When the page table entry information is not present in the corresponding TLB (i.e., when a "TLB miss" occurs), the IOMMU performs the above-described page table walk—and may then cache a copy of information from the acquired page table entry in the TLB.

Because different arrangements of peripherals can be found in different computing devices, using a one-size-fits-all approach to TLB design can result in less than optimal performance for the IOMMU. For example, a TLB in an IOMMU may be implemented using a type of memory (e.g., synchronous dynamic random access memory (SRAM)) that is not optimally-suited for at least some of the numerous possible arrangements of peripherals.

BRIEF DESCRIPTION OF THE FIGURES

Throughout the figures and the description, like reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments. Thus, the described embodiments are not limited to the embodiments shown, but are to be accorded the widest scope consistent with the principles and features disclosed herein.

Virtual Memory

The described embodiments use a "virtual memory" technique for handling data accesses by software programs being executed in a computing device and by peripherals for the computing device. In the described embodiments, when data is accessed by a program or a peripheral, a block of memory of a given size (e.g., 4 kB, 64 kB, etc.) that includes the data, which is called a "page" of memory, is copied from a mass storage device to an available physical location in a memory in the computing device or newly created at a physical location in the memory. In order to avoid programs or peripherals being required to keep track of the physical locations of pages in memory, in the described embodiments, corresponding memory management units (or other entities, such as processors, etc.) keep track of the physical locations of the pages for the programs and peripherals. For example, a memory management unit (MMU) in a processor may keep track of the physical locations of the pages for programs executed by the processor. As another example, an input-output memory management unit (IOMMU) may keep track of the physical locations of the pages for the peripherals. In these embodiments, programs and peripherals (or workloads executed by the peripherals) address memory using "virtual addresses" in "virtual address spaces," which are address spaces that are specific to corresponding programs or peripherals, instead of addressing memory using addresses based on the physical locations of pages (or "physical addresses"). From a program or peripheral's perspective, virtual addresses indicate the locations where data is stored within the pages in memory and memory accesses are made using the virtual addresses accordingly. The virtual addresses, however, may not map directly to the physical addresses of the physical locations where data is stored in pages in the memory. As part of managing the physical locations of pages, the memory management units translate the virtual addresses used by the programs and peripherals in memory access requests into the physical addresses where the data is actually located. The memory management units provide the translated physical addresses to the programs (or an operating system, etc.) or the peripherals, which then use the physical addresses to perform memory accesses.

In order to enable the above-described virtual address to physical address translation, the described embodiments include a "page table." The page table is a record stored in a memory of the computing device that includes an entry, or a "page table entry," with virtual address to physical address translation information for pages that are stored in the memory. Upon receiving a request from a program or a peripheral to access memory at a virtual address, a corresponding memory management unit (or another entity, such as a processor) acquires corresponding physical address information from the page table by performing a "page table walk," during which the page table is searched, possibly entry-by-entry, for a page table entry that provides the physical address associated with the virtual address.

Because page table walks are relatively slow, it is desirable to avoid performing page table walks. The described embodiments therefore include translation lookaside buffers ("TLBs"), which are local caches in, or associated with, processors and IOMMUs (and possibly peripherals) that are used for storing a limited number of copies of information based on page table entries that were acquired during page table walks. When performing virtual address to physical address translations, the memory management units first perform a lookup in the corresponding TLB in an attempt to acquire cached page table entry information from the corresponding TLB. When the page table entry information is not present in the corresponding TLB (i.e., when a "miss" occurs), the memory management units perform the above-described page table walk to acquire the desired page table entry—and may cache a copy of information from the acquired page table entry in the corresponding TLB.

Overview

In the described embodiments, a computing device includes an input-output memory management unit (IOMMU) and one or more peripherals. Generally, the IOMMU handles accesses by the peripherals to a memory in the computing device, including performing virtual address to physical address translations. In the described embodiments, the IOMMU includes two or more memory elements that can be used for performing the virtual address to physical address translations. For example, the IOMMU may include a first memory element having a first type of memory circuits (e.g., static random access memory (SRAM)), a second memory element having a second type of memory circuits (e.g., phase-change memory (PCM)), etc., each of which may be used for performing virtual address to physical address translations as described herein.

In the described embodiments, the two or more memory elements in the IOMMU can be used for storing virtual address to physical address translation information for a translation lookaside buffer (TLB) in the IOMMU (e.g., records of virtual address to physical address translations, associated metadata, etc.). In the described embodiments, a controller in the IOMMU, based on one or more factors, determines that one or more of the memory elements are to be used to store virtual address to physical address translation information for the TLB. For example, the one or more factors may be associated with, dependent on, or otherwise relevant to the performance of virtual address to physical address translations in IOMMU, the peripherals, etc. The controller then uses the one or more of the memory elements for storing virtual address to physical address translation information for the TLB. In the described embodiments, upon determining that a particular memory element is not to be used to store virtual address to physical address translation information for the TLB, the controller may disable the particular memory element (e.g., power down the element) or make the particular element available for other uses.

In some embodiments, some or all of the memory elements from among the two or more memory elements are used to store blocks of page table information. In these embodiments, blocks (e.g., multi-entry sections, regions, etc.) of the page table may be moved from a location in a memory in the computing device to the memory elements. In some of these embodiments, memory elements (or portions thereof) that are not being used to store virtual address to physical address translation for the TLB in the IOMMU are used to store the blocks of page table information.

In some embodiments, the IOMMU includes a non-volatile memory element that is used for preserving (i.e., retaining) information for performing virtual address to physical address translations when the IOMMU is powered down. In these embodiments, after the IOMMU is powered up, information from the non-volatile memory element may be used to update some or all of the virtual address to physical address translation information for the TLB in the IOMMU and/or blocks of page table information in the IOMMU.

By using the two or more memory elements in the IOMMU to perform virtual address to physical address translation as described, the described embodiments enable the use of the memory elements in the IOMMU in a manner that is suitable for the particular types of memory elements in the IOMMU, the peripherals in the computing device, etc. This can enable more efficient, balanced, and/or optimized use of the memory elements, thereby improving the overall operation of the IOMMU, the peripherals, and the computing device.

Computing Device

Figure 1:
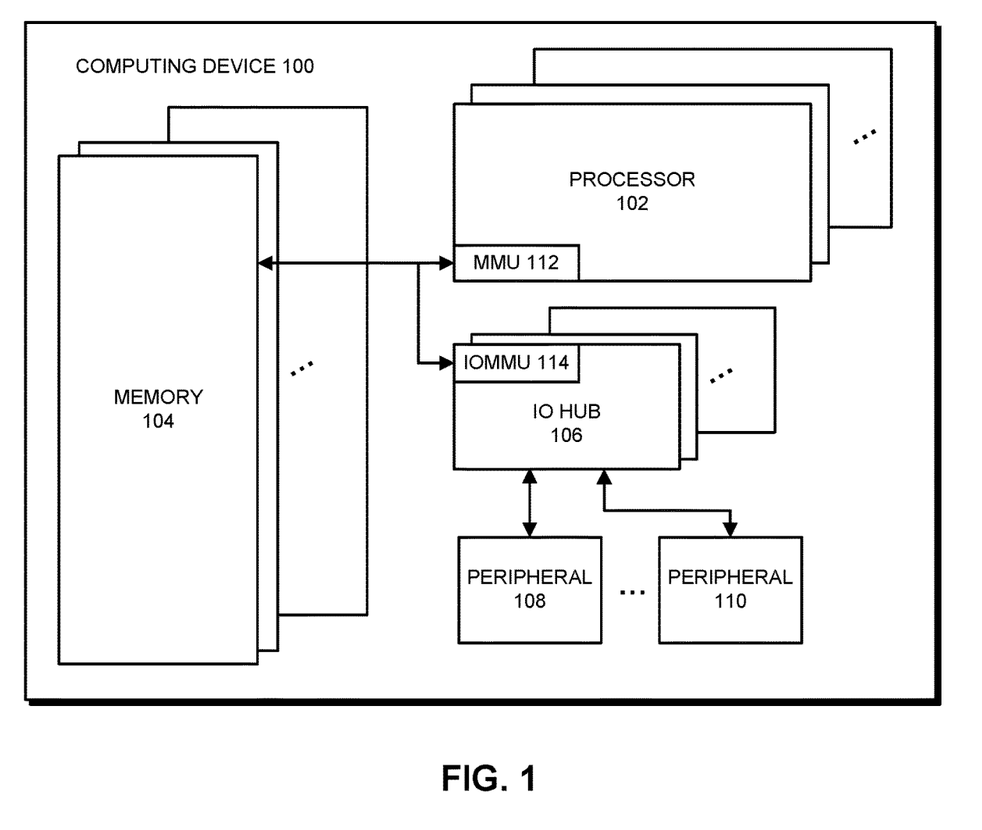
FIG. 1 presents a block diagram illustrating a computing device in accordance with some embodiments.

FIG. 1 presents a block diagram illustrating a computing device 100 in accordance with some embodiments. As can be seen in FIG. 1, computing device 100 includes processor 102, memory 104, input-output (10) hub 106, and peripherals 108-110. Processor 102 is a functional block that performs computational operations in computing device 100. In some embodiments, processor 102 includes one or more central processing unit (CPUs) cores, and/or other processing functional blocks.

Memory 104 is a functional block that performs operations for storing and providing data and instructions to other functional blocks in computing device 100. Memory 104 comprises memory circuits such as one or more of dynamic random access memory (DRAM), double data rate synchronous DRAM (DDR SDRAM), and/or other types of volatile and/or non-volatile memory circuits that are used for storing instructions and data for the other functional blocks, as well as control circuits for handling accesses of the instructions and data that are stored in the memory circuits. In some embodiments, memory 104 is the "main memory" in computing device 100.

As can be seen in FIG. 1, processor 102 includes memory management unit 112. Memory management unit 112 is a functional block that handles interactions between processor 102 and memory 104, such as by performing virtual address to physical address translations, memory access permission checking, etc.

IO hub 106 is a functional block that handles interactions between peripherals such as peripherals 108-110 and other functional blocks in computing device 100 (e.g., processor 102, memory 104, etc.). For example, IO hub 106 may receive communications (inputs, events, interrupts, data, etc.) from peripherals 108-110 and forward the communications to other functional blocks in computing device 100. As another example, IO hub 106 may receive communications (commands, outputs, events, interrupts, data, etc.) from processor 102, memory 104, and/or other functional blocks in computing device 100 and forward the communications to corresponding peripherals.

As can be seen in FIG. 1, IO hub 106 includes IOMMU 114. IOMMU 114 is a functional block that handles interactions between peripherals 108-110 and memory 104. For example, IOMMU 114 may perform virtual address to physical address translations, memory access protection for memory 104 from peripherals 108-110, peripheral event and interrupt handling, etc. In the described embodiments, IOMMU 114 selects memory elements to be used for performing virtual address to physical address translations, as described in more detail below.

Peripherals 108-110 include actual/real or virtual devices that interact with other functional blocks in computing device 100. For example, in some embodiments, peripherals 108-110 include one or more of graphics processing units (GPUs), embedded processors, application specific integrated circuits (ASICs), digital signal processors (DSPs), network processors, disk drives, expansion cards (video cards, sound cards, network interface controllers, etc.), mice/keyboards, microphones, media players, controllers, and/or other peripherals. In some embodiments, peripherals 108-110 are connected to IO hub through one or more corresponding IO interfaces, such as a low pin count (LPC) interface, a universal serial Bus™ (USB) interface, a Peripheral Component Interconnect Express™ (PCIe) bus by PCI-SIG of Beaverton, Oreg., and/or another expansion bus. In some embodiments, some or all of the peripherals have offload capabilities, and thus are able to offload some computational work from processor 102 and/or other functional blocks in computing device 100.

In some embodiments, one or more of the peripherals 108-110 include memory elements that are used for performing virtual address to physical address translations. For example, peripherals 108-110 may include memory elements that are used for holding virtual address to physical address translation information (virtual address to physical address translations, metadata, etc.) for TLBs in the peripherals. In these embodiments, peripherals 108-110 may perform lookups in the TLBs in the peripherals to translate virtual addresses to physical addresses, if such translation information exists in the TLBs in the peripherals, as an alternative to communicating requests for translations to IOMMU 114.

In some embodiments, communication paths (that include one or more of buses, wires, guides, and/or connections) are coupled between the various elements in computing device 100 (processor 102, memory 104, etc.), as shown by arrow-headed lines between the elements. The communication paths are used to transmit commands, data, event notifications, interrupts, and/or other information between the elements. In some embodiments, some or all of the communication paths include functional blocks for handling communication on the communication paths, protocol conversions, etc. For example, in some embodiments, one or more of the communication paths include buses of different protocols and functional blocks for converting (i.e., bridging) communications between the buses. In some embodiments, the communication paths include a HyperTransport™ bus by the HyperTransport Consortium of Sunnyvale, Calif., a QuickPath Interconnect (QPI) bus, and/or another frontside bus.

Although computing device 100 is described with a particular arrangement of functional blocks, some embodiments include a different number and/or arrangement of functional blocks. For example, some embodiments have multiple processors, memories, and/or IO hubs, as shown by the multiple elements and ellipses in FIG. 1. As another example, in some embodiments, computing device 100 includes a number of cache memories. As yet another example, in some embodiments, computing device 100 includes a different number of peripherals (shown by an ellipsis between peripherals 108-110 in FIG. 1). Generally, the described embodiments can use any number or arrangement of functional blocks that can perform the operations herein described.

Although a particular computing device 100 is presented for illustrative purposes, in some embodiments, computing device 100 includes additional functional blocks or other elements for performing the operations herein described and/or other operations. For example, computing device 100 may include power controllers, batteries, media processors, communication mechanisms (e.g., a northbridge, a southbridge, etc.), networking mechanisms, display mechanisms, etc.

Computing device 100 can be, or can be included in, any electronic device that performs computational operations. For example, computing device 100 can be, or can be included in, electronic devices such as desktop computers, laptop computers, wearable computing devices, tablet computers, smart phones, servers, network appliances, toys, audio-visual equipment, home appliances, controllers, etc., and/or combinations thereof.

Input-Output Memory Management Unit

Figure 2:
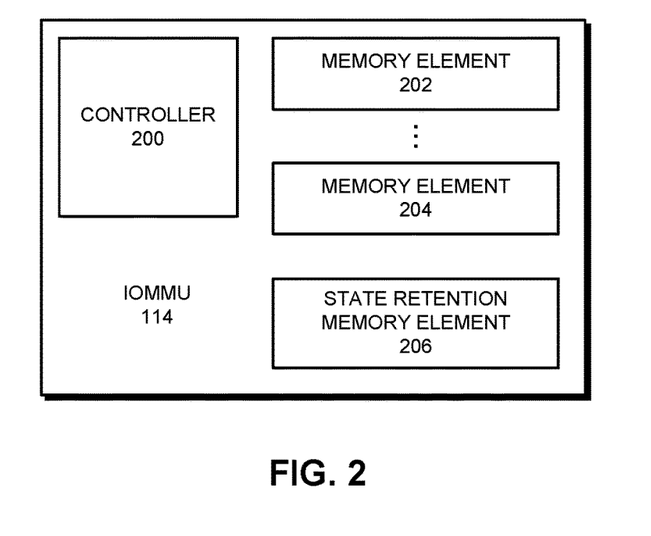
FIG. 2 presents a block diagram illustrating an input-output memory management unit (IOMMU) in accordance with some embodiments.

FIG. 2 presents a block diagram illustrating IOMMU 114 in accordance with some embodiments. As can be seen in FIG. 2, IOMMU 114 includes controller 200, memory elements 202-204, and state retention memory element 206. Controller 200 is a functional block that performs operations for handling interactions between peripherals 108-110 and memory 104. The operations performed by controller 200 can include virtual address to physical address translations, memory access protection for memory 104 from peripherals 108-110, peripheral event and interrupt handling, etc. In some embodiments, controller 200 includes a microcontroller, an ASIC, an embedded processor, a CPU core, and/or another functional block. In some embodiments, controller 200 includes general purpose processing circuits that execute program code (e.g., firmware, software routines, etc.) for performing some or all of the operations herein described. In some embodiments, controller 200 includes purpose-specific circuits (e.g., logic circuits, computational circuits, discrete circuit elements, etc.) that perform some or all of the operations herein described.

Memory elements 202-204 are functional blocks that include memory circuits to be used for performing virtual address to physical address translations in IOMMU 114. In other words, memory elements 202-204 include memory circuits that can be used for storing virtual address to physical address translation information and metadata for a translation lookaside buffer (TLB) in IOMMU 114 and/or blocks of page table information (where a "block" of page table information includes multiple page table entries). Memory elements 202-204 each include volatile and/or non-volatile memory circuits such as static random access memory (SRAM), DRAM (such as DDR SDRAM, etc.), PCM, memristor, magnetoresistive random access memory (MRAM), spin-transfer torque MRAM (STT MRAM), flash memory, and/or other types of memory circuits.

In some embodiments, the memory circuits in each of memory elements 202-204 have one or more different characteristics. For example, the characteristics can be characteristics such as speed, capacity (in terms of bytes of storage available), monetary cost, susceptibility to wear-out, average read/write cycles to failure, power consumption, size of circuits (in terms of layout area), hardware interfaces, operating temperature, software support (e.g., compatibility with software programs such as operating systems, drivers, applications, etc.), communication interface bandwidth, and/or other characteristics. For example, in some embodiments, memory element 202 includes a first type of memory (e.g., SRAM) that is fast, but expensive (in terms of monetary cost, power consumption, and/or other costs), and memory element 204 includes a second type of memory (e.g., PCM) that is slower, but cheaper and thus more scalable (e.g., cheaper to purchase in larger capacities, install, operate, etc. than memory element 202).

As described above, one or both of memory elements 202-204 can be used for storing virtual address to physical address translation information for a TLB in IOMMU 114. For example, the memory elements 202-204 can be used to store virtual address to physical address translations, metadata associated with virtual address to physical address translations, summary information regarding the virtual address to physical address translations, and/or other information to be stored in or associated with a TLB in IOMMU 114. The virtual address to physical address translations include information for determining physical locations (e.g., pages, regions, etc.) in memory 104 to which corresponding virtual addresses map. For example, given some or all of the bits of a virtual address, some or all of the bits of a corresponding physical address may be acquired from memory element 202 and/or 204. Metadata includes information associated with, characterizing, controlling, and/or otherwise relevant to one or more corresponding virtual address to physical address translations, such as validity information, age, number and/or type of accesses, access permissions (e.g., read, read/write, access privilege level, etc.), page size indicators, dirty indicators (e.g., indicating when data for a corresponding page has been modified), and/or other information. The summary information includes information associated with, characterizing, controlling, and/or otherwise relevant to the virtual address to physical address translations in the TLB, the accesses of the TLB, etc., such as a record of pages or addresses that have been accessed, pages or addresses with particular access types, pages or addresses with specified characteristics, identifications of peripherals that are accessing one or more addresses and/or pages, etc.

When a memory element of memory elements 202-204 is used to store virtual address to physical address translation information for the TLB, controller 200 (and, more generally, IOMMU 114) can perform TLB operations using the information stored in the memory element. For example, controller 200 can perform operations such as virtual address to physical address translation, metadata acquisition, page permission checking, TLB updates, summary data acquisition, etc. In these embodiments, controller 200 can store virtual address to physical address translation information for the TLB in the memory element in such a way that the above-described TLB operations can be performed. For example, the memory element may be logically divided into a set of TLB entries, each TLB entry including a corresponding number of bits (e.g., 256 bits, 96 bits, etc.), with portions of the bits used for storing virtual address to physical address translation information, metadata, etc.

In some embodiments, the memory element is arranged (or the memory elements are arranged) with two or more hierarchical lookup structures that can be used for lookups of virtual address to physical address translations in the TLB. For example, the memory element (or memory elements) may be used to store a directory, a Bloom filter, etc. that can be used to perform fast initial lookups to determine if TLB information is not present in the TLB in order to avoid a full lookup when possible.

In the described embodiments, controller 200 can select one or more memory elements from memory elements 202-204 to be used to store the virtual address to physical address translation information for the TLB in IOMMU 114. More specifically, based on one or more factors, controller 200 determines that one or more memory elements are to be used to store virtual address to physical address translation information for the TLB. Generally, the factors include factors associated with, dependent on, or otherwise relevant to the performance of virtual address to physical address translations in IOMMU 114 and/or peripherals 108-110 (and, more generally, the operation of computing device 100). (Examples of factors are described below.) Controller 200 then uses the determined one or more memory elements for storing virtual address to physical address translation information for the TLB. For example, each of the one or more memory elements may be used to store a corresponding "portion" of the virtual address to physical address translation information for the TLB, such as storing corresponding subsets of a set of virtual address to physical address translation information for the TLB. For instance, the one or more selected memory elements may store a given fraction of virtual address to physical address translation information (half, etc.), virtual address to physical address translation information associated with certain peripherals, virtual address to physical address translation information for particular virtual address ranges, etc.

In some embodiments, after controller 200 determines the one or more memory elements of memory elements 202-204 to be used to store virtual address to physical address translation information, controller 200 powers up, transitions between power states, and/or otherwise makes the one or more memory elements available. For example, in some embodiments, a memory element may be disabled (e.g., powered down, in a low power state, etc.) and therefore transitioned to a full power state, such as by setting a supply voltage for the memory element to a level at which information can be retained in the memory element, by activating a controlling clock for the memory element, by activating an interface functional block for the memory element, etc.

In some embodiments, when controller 200 determines that a particular memory element of memory elements 202-204 is not to be used to store virtual address to physical address translation information for the TLB, the particular memory element is disabled (e.g., transitioned to or maintained powered off, in a low power state, etc.) or made available for other uses.

In some embodiments, memory elements 202-204 may be used for storing other information. For example, a portion or region of one or more of memory elements 202-204 (e.g., a given number of bytes starting from a specified location in the memory element) may be allocated, reserved, etc. for storing virtual address to physical address translation for the TLB, and other portion(s) or region(s) of the memory element may be allocated for other uses.

In some embodiments, one or more memory elements of memory elements 202-204 can be used to store for blocks of page table information. In other words, the memory elements can store portions, sections, etc. of the page table that include multiple page table entries (and possibly a large number of page table entries) with corresponding virtual address to physical address translation information, metadata, etc. The blocks of page table information that are stored in the memory elements are similarly arranged to page table information that is stored in memory 104 (e.g., include similar information that is similarly organized). In these embodiments, page table walks can be performed at least partially using the blocks of page table information stored in memory elements.

In some embodiments, computing device 100 (i.e., an entity such as controller 200 or processor 102) can monitor page table accesses and recognize that IOMMU 114 and/or one or more peripherals have accessed given blocks of the page table and/or that the accesses conform to one or more policies (e.g., number of accesses, number of peripherals accessing, etc.). Computing device 100 can then move the given blocks of the page table from memory 104 to one or more memory elements among memory elements 202-204 that are available for use for storing for blocks of page table entries in IOMMU 114. In other words, the block of the page table can be removed or copied from memory 104 and stored in the one or more memory elements. In these embodiments, entities in computing device 100 that are to walk the blocks of the page table stored in the one or more memory elements acquire the blocks of the page table from the memory elements and search them as described above.

In some embodiments, memory elements 202-204 may appear, when available to store blocks of page table information, as a portion of an overall memory in computing device 100. For example, IOMMU 114 and memory elements 202-204 may appear as a node in a non-uniform memory access (NUMA) system.

State retention memory element 206 is a functional block that includes non-volatile memory circuits (e.g., flash, etc.) that are used for preserving information for performing virtual address to physical address translations when IOMMU 114 is powered down (e.g., when IOMMU 114 is in a low-power mode or powered off). For example, state retention memory element 206 may be used to store copies of virtual address to physical address translation information from the TLB and/or blocks of page table information. In some embodiments, information from state retention memory element 206 may be acquired, e.g., during or after a power-up operation for IOMMU 114, and used to update some or all of the virtual address to physical address translation information in the TLB and/or blocks of page table information in the IOMMU.

In some embodiments, the virtual address to physical address translation information is preserved in state retention memory element 206 (i.e., stored therein) as part of a sequence for powering down IOMMU 114. For example, before powering down IOMMU 114, some or all virtual address to physical address translation information for the TLB and/or blocks of page table information in the IOMMU may be copied into state retention memory element 206. In some embodiments, state retention memory element 206 is dynamically updated as virtual address to physical address translation information is stored in the TLB and/or blocks of page table information is stored in the IOMMU.

In some embodiments, the validity of the information stored in state retention memory element 206 is verified before being used for updates, such as by verifying that the information for performing virtual address to physical address translations and/or blocks of page table information remains current and accurate. For example, controller 200 may determine that the mappings between virtual addresses and physical addresses have not changed since the information was stored in state retention memory element 206.

Although IOMMU 114 is shown with two memory elements (i.e., memory elements 202-204), in some embodiments, IOMMU 114 includes more memory elements (as shown by the ellipsis in FIG. 2). In these embodiments, the operations described herein (i.e., determining selected memory elements, using the selected memory elements, etc.) can be performed for the corresponding number of memory elements. Generally, the described embodiments can be used with any number of memory elements in IOMMU 114. In addition, although IOMMU 114 is shown with state retention memory element 206, in some embodiments, IOMMU 114 does not include state retention memory element 206.

Factors

As described above, based on one or more factors, a controller (e.g., controller 200) determines memory elements that are to be used to perform virtual address to physical address translations in an IOMMU (e.g., IOMMU 114). Generally, the factors used in making the determination include factors associated with, dependent on, or otherwise relevant to the performance of virtual address to physical address translations in the IOMMU, the peripherals (e.g., peripherals 108-110), and/or the computing device. The factors are representative of corresponding aspects of the operation of the IOMMU and/or the memory elements (e.g., memory elements 202-204) in the IOMMU, the operation of the peripherals and the memory elements (if any) in the peripherals, and/or the operation of the computing device. For example, the factors may be related to speeds at which virtual address to physical address translations are performed in the IOMMU and/or the peripherals, the locations in the IOMMU and/or the peripherals where virtual address to physical address translations are performed, the types of memory elements in the IOMMU and/or the peripherals, etc.

In some embodiments, the factors include the characteristics of the memory elements available in the IOMMU. For example, in some embodiments, a first memory element in the IOMMU has characteristics including a small capacity, but faster access times, and a second memory element in the IOMMU has characteristics including a larger capacity, but slower access times. The controller may determine the one or more of the memory elements to be used for performing virtual address to physical address translations in the IOMMU based at least in part on the characteristics of the memory elements. In some embodiments, the controller also uses a current operating condition, mode, and/or state of the IOMMU, the peripherals, and/or the computing device (e.g., number of virtual address to physical address translations performed, number of peripherals, etc.) when making the determination based on the characteristics of the memory elements. For example, the controller may select a faster memory element to be used to perform virtual address to physical address translations when there are likely to be a larger number of virtual address to physical address translation requests. As another example, the controller may select a larger-capacity memory element when there are likely to be a larger number of virtual address to physical address translations stored in the IOMMU. Using the characteristics of the memory elements to determine which memory elements are to be used as described can enable the IOMMU to store more virtual address to physical address translation information, perform virtual address to physical address translations more quickly, perform virtual address to physical address translations using more reliable memory circuits, etc., depending on operating conditions, modes, or states.

In some embodiments, the factors include the memory elements available (or not) for performing virtual address to physical address translations in the peripherals (i.e., for "locally" performing virtual address to physical address translations in the peripherals, instead of the peripherals requesting the corresponding virtual address to physical address translations from the IOMMU). For example, in some embodiments, some or all of the peripherals have local TLBs implemented using different types and/or arrangements of memory circuits, such when a peripheral has one or more TLBs implemented in SRAM, DRAM, PCM, etc. In these embodiments, the TLBs in the peripherals can be used to cache virtual address to physical address translation information that may or may not also be cached in the TLB in the IOMMU. The controller may determine the one or more of the memory elements in the IOMMU to be used to store virtual address to physical address translation for a TLB in the IOMMU based at least in part on the types and arrangements of memory circuits used as TLBs in the peripherals. For example, when a peripheral has a memory element (or a combination of multiple memory elements) of more than a given capacity to be used to hold virtual address to physical address translation information for a TLB in the peripheral, the controller may determine that a smaller-capacity and/or slower memory element is to be used for holding virtual address to physical address translations in a TLB in the IOMMU. This may avoid the situation where the memory element used for holding virtual address to physical address translations in a TLB in the IOMMU is underused and/or is faster than necessary because peripherals are able to perform most of their own virtual address to physical address translations.

In some embodiments, the factors include an amount of duplication of TLB entries in the TLB in the IOMMU. In some embodiments, the peripherals and processes executed by the peripherals share the TLB in the IOMMU. Because the peripherals and processes can cause the eviction of entries from the TLB in the IOMMU (e.g., after context switches, etc.), it is possible for a peripheral or process to evict TLB entries that are being used by other peripherals or processes. Duplicating TLB entries in the TLB in the IOMMU can help to avoid the eviction of useful TLB entries and the corresponding inefficient operation of the peripherals and/or processes. The controller may determine the memory elements to be used to store virtual address to physical address translation for a TLB in the IOMMU based at least in part on the amount of duplication being used for TLB entries. For example, for more than a threshold amount of duplication, the controller may determine a larger-capacity memory element. In some embodiments, TLB entries (or summary information) in the TLB in the IOMMU include information about the peripherals and/or processes that have accessed TLB entries and/or duplicate TLB entries. In some of these embodiments, information such as an amount of sharing of pages between the peripherals, a distribution and/or a priority of processing reliant on particular pages, and/or a nature of the peripherals accessing pages can be used in duplicating TLB entries and/or determining the memory element based on the duplication.

In some embodiments, the factors include a current or estimated future amount of wear on the memory elements in the IOMMU and/or in the peripherals. Certain types of memory technology (e.g., STT, PCM, etc.) are subject to wearing out, i.e., face a higher likelihood of component/circuit failures as a number of read/write cycles increases. The controller may determine the memory elements to be used to perform virtual address to physical address translations in the IOMMU based at least in part on an amount of wear, a number and/or type of accesses (e.g., TLB lookups, etc.) being made by peripherals, and/or the presence (or absence) of a TLB in the peripheral. For example, when more than a threshold amount of TLB lookups are made by or projected to be made by one or more peripherals in a TLB in the IOMMU, the controller may select a memory with less susceptibility to wear-out.

In some embodiments, information about the factors is known or otherwise acquired in advance of the determination. For example, a particular peripheral may be known by the controller (via a list, table, etc.) to include particular memory elements to be used in performing virtual address to physical address translations (e.g., as a TLB in the peripheral). As another example, an administrator, designer, or other user may input or otherwise provide the controller (or, more generally, the computing device) with information about the factors. As yet another example, the controller may receive reports from the computing device and/or the peripherals about the factors. As yet another example, the controller may monitor virtual address to physical address translations and/or other operations to determine the factors, perhaps over a specified time period (e.g., seconds, hours, days, etc.).

In some embodiments, a specified relationship is maintained between the types of memory used for performing virtual address to physical address translations in the IOMMU and in the peripherals. For example, a target of a total of N entries (where N is a particular integer) for holding virtual address to physical address translation information for corresponding TLBs between the peripheral and the IOMMU may be used. As another example, a target or estimate of a number or rate of virtual address to physical address translations that are able to be performed by the peripherals and the IOMMU may be used.

Although a number of factors are described above, in some embodiments some or all of the factors are not used, other factors are used, and/or the factors are used in combination. For example, the current operating condition, mode, and/or state of the IOMMU, the peripherals, and/or the computing device may be used in combination with other factors, such as duplication, memory elements available in peripherals, etc. As described above, the factors are generally factors associated with, dependent on, or otherwise relevant to the performance of virtual address to physical address translations in the IOMMU and/or the peripherals. One possible purpose, therefore, of using each factor is to enable better decisions to be made regarding which memory elements are to be used (or not) for performing virtual address to physical address translations.

Figure 3:
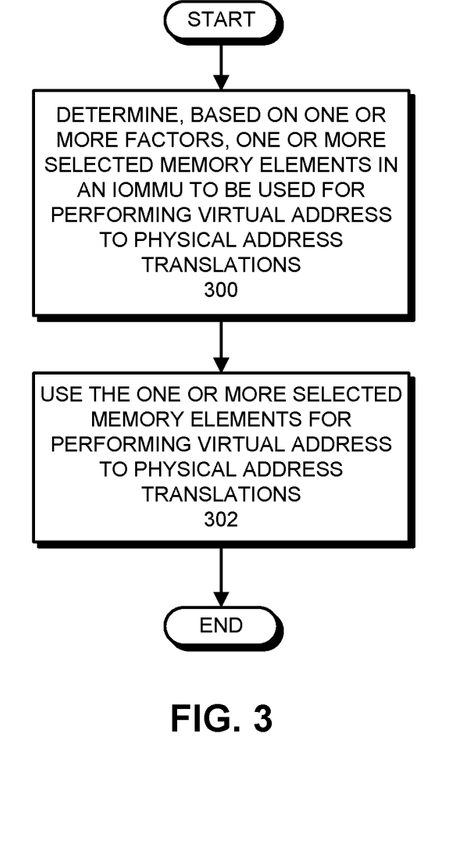
FIG. 3 presents a flowchart illustrating a process for selecting memory elements to be used for performing virtual address to physical address translations in an IOMMU in accordance with some embodiments.

Selecting Memory Elements to be Used for Performing Virtual Address to Physical Address Translations As described above, in the described embodiments, a controller (e.g., controller 200) selects memory elements from among available memory elements in an IOMMU (e.g., IOMMU 114) to be used for performing virtual address to physical address translations. FIG. 3 presents a flowchart illustrating a process for selecting memory elements to be used for performing virtual address to physical address translations in accordance with some embodiments. Note that the operations shown in FIG. 3 are presented as a general example of operations performed by some embodiments. The operations performed by other embodiments include different operations and/or operations that are performed in a different order. Additionally, although certain mechanisms/elements are used in describing the operations (e.g., a controller, etc.), in some embodiments, other mechanisms perform the operations and/or the operations are performed on other mechanisms/elements.

The process shown in FIG. 3 starts when the controller determines, based on one or more factors, one or more selected memory elements from among a set of available memory elements in the IOMMU to be used for performing virtual address to physical address translations (step 300). During this operation, the controller selects memory elements that are to be used for storing virtual address to physical address translation information for a TLB. More specifically, the controller determines which of the memory elements are to be used to store a corresponding portion of the virtual address to physical address translation information for the TLB. As described above, the one or more factors include factors associated with, dependent on, or otherwise relevant to the performance of virtual address to physical address translations in the IOMMU and/or the peripherals (and, more generally, the operation of the computing device in which the IOMMU is located).

In some embodiments, step 300 is performed as the IOMMU starts up (e.g., is initially powered up, restored from a low power state, etc.). In these embodiments, the particular memory elements that are to be used for storing virtual address to physical address translation information for the TLB are set at start-up. In some of these embodiments, the memory elements do not change after being set at start-up. In others of these embodiments, the memory elements may be dynamically changed (i.e., changed, possibly multiple times, as the IOMMU operates). In some of these embodiments, the controller periodically checks the memory elements being used for performing virtual address to physical address translations (e.g., every X seconds, as a given event occurs, etc.), and may dynamically change the memory elements used for performing virtual address to physical address translations. In embodiments that support dynamic memory element changes, the controller (or another entity in the computing device) includes a copying mechanism for copying virtual address to physical address translation information from memory element to memory element to enable the changes.

In some embodiments, during step 300, the controller also selects memory elements that are to be used for storing blocks of page table information. In some of these embodiments, memory elements and/or portions of memory elements that are not used for storing virtual address to physical address translation information for the TLB may be used for storing the blocks of page table information. For example, a first portion of a memory element (e.g., half, a given number of bytes, etc.) may be reserved, allocated, etc. for storing virtual address to physical address translation information for the TLB, and a second portion may be reserved or allocated for storing blocks of page table information.

The controller then uses the one or more selected memory elements to perform virtual address to physical address translations in the IOMMU (step 302). More specifically, the controller uses at least some of the memory elements for performing translations of virtual addresses to physical addresses, to acquire metadata associated with virtual address to physical address translations, and/or for performing other operations that rely on data (possibly including summary data) in the TLB in the IOMMU. For example, the controller can receive a translation request that includes a virtual address from a peripheral (or from a workload executed by the peripheral), can look up a corresponding physical address in the TLB (i.e., in a corresponding memory element), and can return the physical address to the requesting peripheral. The controller may also use the memory elements (or portions thereof) that are to be used for storing blocks of page table information for storing blocks of page table information. As described above, this operation includes moving or copying the blocks of page table information from a memory (e.g., memory 104 or elsewhere in computing device 100) into the memory elements and subsequently using the blocks of page table information to perform page table walks, etc.

As described above, the controller may power up the memory elements to be used for performing virtual address to physical address translations. For example, in some embodiments, when a memory element is not being used for performing virtual address to physical address translations, the memory element is transitioned to, or maintained in, a low power state, such as with a supply voltage reduced (perhaps to zero), a controlling clock frequency reduced (perhaps to zero), etc. In these embodiments, when the controller determines that the memory element is to be used for performing virtual address to physical address translations, the memory element can be transitioned to a powered up state, such as with a supply voltage increased to one of one or more operating voltages, a controlling clock frequency increased to one of one or more operating frequencies, etc.

Figure 4:
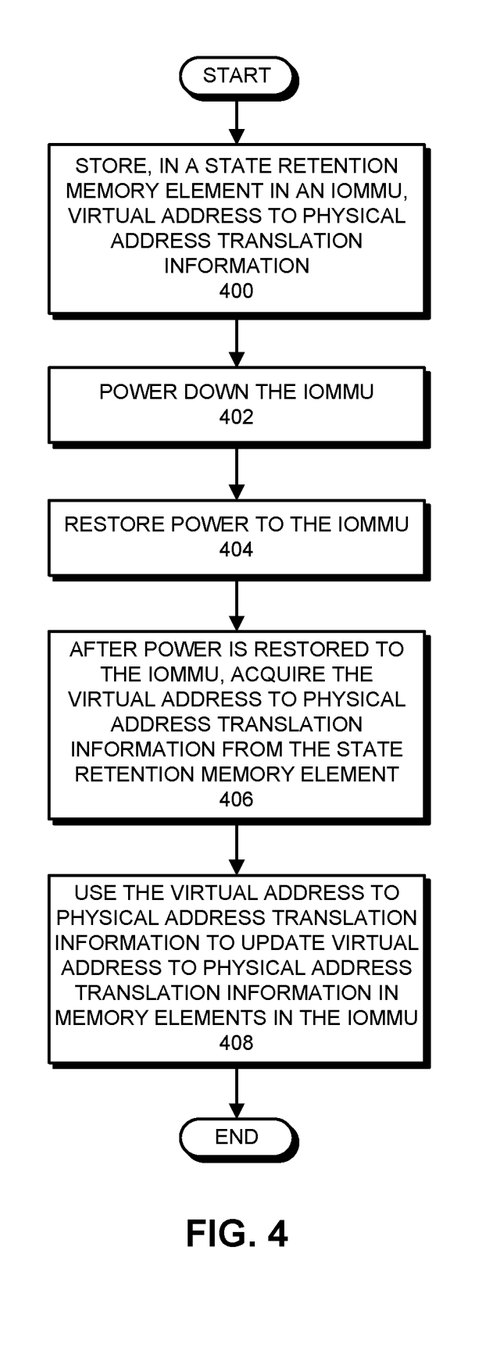
FIG. 4 presents a flowchart illustrating a process for using a state retention memory element to update virtual address to physical address translation information in a memory element in an IOMMU in accordance with some embodiments.

Using a State Retention Memory Element to Update Virtual Address to Physical Address Translation Information in Memory Elements FIG. 4 presents a flowchart illustrating a process for using a state retention memory element (e.g., state retention memory element 206) to update virtual address to physical address translation information in a memory element in an IOMMU (e.g., IOMMU 114) in accordance with some embodiments. Note that the operations shown in FIG. 4 are presented as a general example of operations performed by some embodiments. The operations performed by other embodiments include different operations and/or operations that are performed in a different order. Additionally, although certain mechanisms/elements are used in describing the operations (e.g., a controller, etc.), in some embodiments, other mechanisms perform the operations and/or the operations are performed on other mechanisms/elements.

The process shown in FIG. 4 starts when a controller (e.g., controller 200) stores, in a state retention memory element, information to be used for performing virtual address to physical address translations (step 400). For example, in some embodiments, the controller can store, in the state retention memory element, virtual address to physical address translation information copied from a TLB in the IOMMU and/or otherwise based on information in the TLB. As another example, in some embodiments, the controller can store, in the state retention memory element, blocks of page table information copied from one or more of the memory elements. The controller can store the information in the state retention memory element as information is added to, updated, or otherwise changed in the memory element(s) (e.g., memory elements 202-204) in the IOMMU and/or can be performed as part of a power-down operation for the IOMMU (e.g., as the IOMMU is transitioned from a full power state to a low power state).

The IOMMU is then powered down (step 402). For example, the IOMMU may be transitioned to a low power state to conserve power. In the low power state, the memory elements in which virtual address to physical address translation information is stored may be maintained in an operating state (i.e., at corresponding voltages, currents, clock frequencies, etc.) insufficient to retain data in the memory elements. By storing the virtual address to physical address translation information in the state retention memory element as described, the virtual address to physical address translation information is preserved while the IOMMU is in the low power state.

Next, power is restored to the IOMMU (step 404). For example, the IOMMU may be transitioned from the low power state to a full power state. In the full power state, the memory elements in the IOMMU are maintained in an operating state sufficient to retain data in the memory elements. Due to the earlier transition through the low power state, however, the memory elements may no longer hold virtual address to physical address translation information (i.e., the information may have been lost when the memory elements were powered down). The controller therefore acquires, from the state retention memory element, the preserved virtual address to physical address translation information (step 406). The controller then uses the virtual address to physical address translation information to update some or all of the virtual address to physical address translation information in the memory elements (step 408). For example, the controller may use the virtual address to physical address translation information acquired from state retention memory element to update the TLB in the IOMMU (e.g., fill one or more entries in the TLB, etc.). As another example, the controller may copy blocks of page table information from the state retention memory element to one or more memory elements in the IOMMU.

In some embodiments, before updating the memory elements as in step 408, the controller verifies the validity of the virtual address to physical address translation information. Generally, this operation includes determining, based at least in part on an operating environment of IOMMU, that the virtual address to physical address translation information is still current, i.e., has not changed since the IOMMU was powered down. For example, the controller can inquire with one or more other entities in the computing device (e.g., processor 102, etc.) to determine if virtual address to physical address translation mappings and/or blocks of page table information changed while IOMMU was powered down.

In some embodiments, a computing device (e.g., computing device 100 in FIG. 1 and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), controllers, memory management units (e.g., IOMMUs, MMUs, etc.), compute units, embedded processors, graphics processors (GPUs)/graphics cores, pipelines, Accelerated Processing Units (APUs), and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations.

In some embodiments, a data structure representative of some or all of the structures and mechanisms described herein (e.g., computing device 100 and/or some portion thereof) is stored on a computer-readable storage medium that includes a database or other data structure which can be read by a computing device and used, directly or indirectly, to fabricate hardware comprising the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates/circuit elements from a synthesis library that represent the functionality of the hardware comprising the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, functional blocks include one or more interrelated circuits that perform the described operations. In some embodiments, the circuits in a functional block include circuits that execute program code (e.g., microcode, firmware, applications, etc.) to perform the described operations.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A computing device, comprising:
   two or more memory elements; and
   an input-output memory management unit (IOMMU), the IOMMU including a controller that is configured to:
      select, based on one or more factors, one or more selected memory elements from among the two or more memory elements for performing virtual address to physical address translations in the IOMMU;
      perform the virtual address to physical address translations using the one or more selected memory elements; and
      use unselected memory elements from among the two or more memory elements that are not selected for performing virtual address to physical address translations for operations other than performing virtual address to physical address translations or disable the unselected memory elements.

2. The computing device of claim 1, wherein:
   at least one of the two or more memory elements includes a first type of memory circuits; and
   at least one of the two or more memory elements includes a second type of memory circuits, wherein the first type of memory circuits is different than the second type of memory circuits.

3. The computing device of claim 1, wherein:
   at least one of the two or more memory elements is a non-volatile memory element that includes non-volatile memory circuits; and
   at least one of the two or more memory elements is a volatile memory element that includes volatile memory circuits.

4. The computing device of claim 1, wherein each of the two or more memory elements and the IOMMU are fabricated in semiconductor circuits on separate semiconductor dies.

5. The computing device of claim 1, wherein each of the two or more memory elements and the IOMMU are separate from one another within the computing device.

6. The computing device of claim 1, further comprising:
   at least one processor separate from the IOMMU, the at least one processor being communicatively coupled to the IOMMU.

7. The computing device of claim 1, wherein one or more peripherals coupled to the IOMMU comprise peripheral memory elements, each peripheral memory element to be used by a corresponding peripheral to store virtual address to physical address translation information, the virtual address to physical address translation information to be used by the corresponding peripheral for locally performing virtual address to physical address translations, and wherein:
   the one or more factors comprise types of the peripheral memory elements in the one or more peripherals; and
   selecting the one or more selected memory elements comprises selecting at least one type of selected memory element to be used for performing virtual address to physical address translations in the IOMMU based on the types of the peripheral memory elements in the one or more peripherals.

8. The computing device of claim 1, wherein:
   the one or more factors comprise an amount of duplication of virtual address to physical address translation information; and
   selecting the one or more selected memory elements comprises selecting at least one type of selected memory element to be used for performing virtual address to physical address translations in the IOMMU based on the amount of duplication.

9. The computing device of claim 1, wherein:
   the one or more factors comprise amounts of wear on some or all of the two or more memory elements; and
   selecting the one or more selected memory elements comprises selecting at least one type of selected memory element to be used for performing virtual address to physical address translations in the IOMMU based on the amounts of wear.

10. The computing device of claim 1, wherein using the one or more selected memory elements comprises:
    storing, in at least one of the one or more selected memory elements, virtual address to physical address translation information for a translation lookaside buffer for the IOMMU.

11. The computing device of claim 1, wherein using the one or more selected memory elements comprises:
    storing, in at least of the one or more selected memory elements, copies of one or more blocks of page table information, each block of page table information including a plurality of corresponding page table entries with virtual address to physical address translation information.

12. The computing device of claim 1, wherein using the one or more selected memory elements comprises:
    transitioning memory elements of the one or more selected memory elements that are in a low power state from the low power state to a powered up state.

13. The computing device of claim 1, further comprising:
    a non-volatile memory element, the non-volatile memory element configured to preserve information to be used for performing virtual address to physical address translations in the IOMMU while the IOMMU is powered down;
    wherein the controller is further configured to, after the IOMMU is powered up:
       acquire, from the non-volatile memory element, the information; and
       update some or all of the one or more selected memory elements based on the information.

14. A method for operating an input-output memory management unit (IOMMU) having a controller in a computing device that includes the IOMMU and two or more memory elements, the method comprising:
    selecting, by the controller, based on one or more factors, one or more selected memory elements from among the two or more memory elements for performing virtual address to physical address translations in the IOMMU;
    performing, by the controller, the virtual address to physical address translations using the one or more selected memory elements; and
    causing, by the controller, unselected memory elements from among the two or more memory elements that are not selected for performing virtual address to physical address translations to be used for operations other than performing virtual address to physical address translations or disabling, by the controller, the unselected memory elements.

15. The method of claim 14, wherein:
    at least one of the two or more memory elements includes a first type of memory circuits; and at least one of the two or more memory elements includes a second type of memory circuits, wherein the first type of memory circuits is different than the second type of memory circuits.

16. The method of claim 14, wherein:
at least one of the two or more memory elements is a non-volatile memory element that includes non-volatile memory circuits; and
at least one of the two or more memory elements is a volatile memory element that includes volatile memory circuits.

17. The method of claim 14, wherein each of the two or more memory elements and the IOMMU are fabricated in semiconductor circuits on separate semiconductor dies.

18. The method of claim 14, wherein each of the two or more memory elements and the IOMMU are separate from one another within the computing device.

19. The method of claim 14, wherein the computing device includes at least one processor separate from the IOMMU, the at least one processor being communicatively coupled to the IOMMU.

20. The method of claim 14, wherein one or more peripherals coupled to the IOMMU comprise peripheral memory elements, each peripheral memory element to be used by a corresponding peripheral to store virtual address to physical address translation information, the virtual address to physical address translation information to be used by the corresponding peripheral for locally performing virtual address to physical address translations, and wherein:
the one or more factors comprise types of the peripheral memory elements in the one or more peripherals; and
selecting the one or more selected memory elements comprises selecting, by the controller, at least one type of selected memory element to be used for performing virtual address to physical address translations in the IOMMU based on the types of the peripheral memory elements in the one or more peripherals.

21. The method of claim 14, wherein:
the one or more factors comprise an amount of duplication of virtual address to physical address translation information; and
selecting the one or more selected memory elements comprises selecting, by the controller, at least one type of selected memory element to be used for performing virtual address to physical address translations in the IOMMU based on the amount of duplication.

22. The method of claim 14, wherein:
the one or more factors comprise amounts of wear on some or all of the two or more memory elements; and
selecting the one or more selected memory elements comprises selecting, by the controller, at least one type of selected memory element to be used for performing virtual address to physical address translations in the IOMMU based on the amounts of wear.

23. The method of claim 14, wherein using the one or more selected memory elements comprises:
storing, by the controller, in at least one of the one or more selected memory elements, virtual address to physical address translation information for a translation lookaside buffer for the IOMMU.

24. The method of claim 14, wherein using the one or more selected memory elements comprises:
storing, by the controller, in at least of the one or more selected memory elements, copies of one or more blocks of page table information, each block of page table information including a plurality of corresponding page table entries with virtual address to physical address translation information.

25. The method of claim 14, wherein using the one or more selected memory elements comprises:
transitioning memory elements of the one or more selected memory elements that are in a low power state from the low power state to a powered up state.

26. The method of claim 14, wherein:
the computing device includes a non-volatile memory element, the non-volatile memory element configured to preserve information to be used for performing virtual address to physical address translations in the IOMMU while the IOMMU is powered down; and
the method further comprises, after the IOMMU is powered up:
acquiring, by the controller, from the non-volatile memory element, the information; and
updating, by the controller, some or all of the one or more selected memory elements based on the information.

* * * * *